(12) United States Patent
Woo et al.

(10) Patent No.: US 10,571,979 B2
(45) Date of Patent: Feb. 25, 2020

(54) COOLING FAN SPEED CONTROL PROFILE

(71) Applicant: Dell Products L.P., Round Rock, TX (US)

(72) Inventors: Joohyun Woo, Round Rock, TX (US);
Kevin Locke, Georgetown, TX (US);
Travis North, Cedar Park, TX (US);
Andrew Ingalls, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 15/461,204

(22) Filed: Mar. 16, 2017

(65) Prior Publication Data

US 2018/0267582 A1    Sep. 20, 2018

(51) Int. Cl.
*G06F 1/20*   (2006.01)
*G05D 13/62*   (2006.01)

(52) U.S. Cl.
CPC .......... *G06F 1/206* (2013.01); *G05D 13/62* (2013.01); *Y02D 10/16* (2018.01)

(58) Field of Classification Search
None
See application file for complete search history.

(56) References Cited

U.S. PATENT DOCUMENTS

| | | | |
|---|---|---|---|
| 5,929,581 A * | 7/1999 | Van Brocklin | G06F 1/206 318/268 |
| 2007/0297893 A1* | 12/2007 | Alon | F04D 25/166 415/47 |
| 2008/0306704 A1* | 12/2008 | Rockenfeller | G01K 3/10 702/132 |
| 2012/0016526 A1* | 1/2012 | Burton | G05D 23/1931 700/278 |
| 2012/0310439 A1* | 12/2012 | Lin | G05D 23/1934 700/300 |
| 2014/0233176 A1 | 8/2014 | Montero | |
| 2018/0003186 A1* | 1/2018 | Matsuura | F04D 27/004 |

* cited by examiner

*Primary Examiner* — Ryan A Jarrett
(74) *Attorney, Agent, or Firm* — Norton Rose Fulbright US LLP (57) ABSTRACT

Adjusting a cooling fan speed control profile to account for system implementation factors, such as ambient temperature and usage history, can optimize power consumption and reduce the volume and variation of sound generated by shifts in fan speed in response to changes in system and component temperature. Adjusting a cooling fan speed control profile may include adjusting a maximum fan speed based on an ambient temperature or component temperature of the information handling system.

16 Claims, 8 Drawing Sheets

COOLING FAN SPEED CONTROL PROFILE

FIELD OF THE DISCLOSURE

The instant disclosure relates to information handling system cooling systems. More specifically, portions of this disclosure relate to adjustment of cooling fan speed control profiles of cooling systems for information handling systems.

BACKGROUND

As the value and use of information increases, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM), and other components in information handling systems increase in clock speed and power consumption, the amount of heat produced by such components as a side-effect of normal operation has also increased. The temperatures of these components should be kept within a reasonable range to prevent overheating, instability, malfunction, damage, reduced performance, and shortened component lifespan. Accordingly, cooling systems, which may include cooling fans, blowers, and liquid, are included in information handling systems to cool information handling systems and their components.

Cooling systems for information handling systems are often designed to provide sufficient cooling for system components based on a worst-case scenario. Because they are designed to support system operation in a worst-case scenario, cooling systems often provide more cooling than is needed. For example, a user who places a greater load on system components might require greater cooling capabilities than a user who places a lesser load on system components. One user may place a computer in an enclosed location where there is little external airflow, such as next to a wall, while another user may place an computer in an open location with substantial external airflow, such as in the middle of an open room. A user who uses a computer in a warm location would have different cooling requirements from a user who uses a computer in a cooler location. Furthermore, environmental and use conditions that affect cooling system demand may change over time with the changing of the seasons or changing of a user's demands on the system. A computer cooling system designed to provide sufficient cooling in a worst-case scenario of high ambient temperature and high load may provide more cooling than is necessary in situations where the computer is used in a location with a lower ambient temperature and/or with less load. Conventional cooling systems for computers and other information handling systems do not adapt to environment, use, or other factors because the cooling systems are designed for the worst-case scenario. However, this can result in overcooling and reduced efficiency when the worse-case scenario does not reflect the actual conditions.

Shortcomings mentioned here are only representative and are included simply to highlight that a need exists for improved cooling control systems, particularly for cooling control systems employed in information handling systems, such as data centers and personal computing devices. Embodiments described herein address certain shortcomings but not necessarily each and every one described here or known in the art. Furthermore, embodiments described herein may present other benefits than, and be used in other applications than, those of the shortcomings described above.

SUMMARY

Adjusting a cooling fan speed control profile to account for system implementation factors, such as ambient temperature and usage history, can improve efficiency by reducing power consumption and improve user experience by reducing the volume and variation of sound generated by the cooling system. One example adjustment is adjusting a maximum fan speed based on an ambient temperature of the information handling system. For example, a rate at which fan speed is increased may be adjusted, such that a different fan ramp rate is used for different ambient temperatures. The fan ramp rate may be part of a cooling fan speed control profile, along with other control parameters. Another example control parameter is a fan speed response, which may be part of a cooling fan speed control profile. The cooling fan speed control profile may be adjusted by increasing or decreasing the fan speed response by a constant amount based on expected component temperature or ambient temperature. The fan speed control profile may also be adjusted based on a usage history of a component of the information handling system. The usage history may include a record of component temperature over time. Adjusting a fan speed control profile based on usage history and/or ambient temperature can allow the system to control fan operation based on environment and usage. More particularly, the fan speed control profile may adapt a cooling system of an information handling system to its own surroundings, which are unlikely to be the worst-case scenario initially set for the cooling system.

A cooling fan speed control profile may be used in controlling a response of a cooling fan to changes in component or system temperature. For example, a cooling fan speed control profile may include multiple possible system or component temperatures and a corresponding cooling fan speed for each of the possible system or component temperatures. The cooling fan speed control profile may include a maximum fan speed corresponding to a maximum system or component temperature and a minimum or idle fan speed corresponding to a minimum or idle system or component temperature.

A variety of adjustments may be made to a cooling fan speed control profile in response to changes in environment or usage of an information handling system. One method for controlling a cooling system of an information handling system may include receiving a first temperature value from a first temperature sensor, adjusting a rate at which a speed of a cooling fan is increased for every unit increase of a second temperature value based, at least in part, on the first temperature value, and generating a control signal for operating the cooling fan of the information handling system based, at least in part, on the adjusted rate. Adjusting the rate at which a speed of the cooling fan is increased may include decreasing a maximum cooling fan speed when the first temperature value is less than a threshold first temperature value. For example, if an ambient temperature of an information handling system drops below a predetermined threshold temperature, a maximum cooling fan speed may be decreased, as the reduced ambient temperature may cool the system or system component, thereby reducing the need for cooling from a cooling fan. Another method for adjusting a cooling fan speed control profile may include receiving a first temperature value from a first temperature sensor, adjusting a minimum and maximum speed of a cooling fan, while retaining a rate at which the fan speed is increased for every unit increase of a second temperature value between the minimum fan speed and maximum fan speed, wherein the adjusting is based, at least in part, on the first temperature value, and generating a control signal for operating the cooling fan of the information handling system is based, at least in part, on the adjusted rate.

The first temperature may be any recorded or estimated temperature. One example of a first temperature value may be an ambient temperature. Receiving an ambient temperature and adjusting the rate or adjusting the minimum and maximum speed of the cooling fan while retaining the same rate based, at least in part, on the ambient temperature can allow the information handling system cooling system to adjust for changes in system environment. Another example of the first temperature value may be a component temperature. The component temperature may be recorded in a user profile as part of a plurality of temperature values. The cooling fan speed control profile may be adjusted based on the user profile. Adjusting the cooling fan speed control profile may include adjusting the rate at which the speed of the cooling fan is increased for every unit increase of the second temperature value based, at least in part, on the user profile. Alternatively, adjusting the cooling fan speed control profile may include adjusting the minimum and maximum speed of the cooling fan while retaining the same rate based, at least in part, on the user profile. For example, such adjustments may be based on a plurality of component temperatures of the user profile that have been recorded over time. These temperatures may indicate the usage habits of a user. When an information handling system is consistently used in a way that places a heavy load on a component, substantial heat may be generated resulting in elevated temperature readings over time. When elevated temperature readings are recorded for a predetermined period of time the cooling fan speed control profile may be adjusted to provide increased fan speed to further cool the component, such as by increasing an idle fan speed or increasing a ramp rate for increasing a fan speed in response to increases in temperature.

When certain events occur, the cooling fan speed control profile may be reset to a previous cooling fan speed control profile or a default control profile, such as a profile used for a conventional worse-case scenario configuration. One such event may be when the component temperature is greater than a threshold component temperature for a certain duration of time. For example, a maximum fan speed may be reset to a default maximum fan speed, a minimum fan speed may be reset to a default minimum fan speed, and/or a rate at which the speed of the cooling fan is increased for every unit increase of a second temperature may be reset to a default rate. Resetting the cooling fan speed control profile can allow the system to adjust to spikes in component temperature and prevent the component temperature exceeding a maximum component temperature. When a temperature measurement of the user profile is below a threshold component temperature for a set period of time, the cooling fan speed control profile may be adjusted in response.

An apparatus for cooling a system component of an information handling system may include a cooling fan, a first temperature sensor, and a controller coupled to the first temperature sensor and the cooling fan. The controller may be configured to perform steps corresponding to those described above.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling systems may include cooling systems for controlling the environment in the information handling system and around equipment therein. An information handling system may provide a controlled environment, such as a data center, a personal computer enclosure, or a mobile device enclosure, that may be monitored, and cooling systems may be controlled to regulate environmental conditions inside the information handling system to certain specifications. Furthermore, cooling systems may be controlled to regulate temperatures of specific system components of information handling systems. For example, a temperature and/or a humidity of the information handling system or a system component may be monitored and the cooling systems controlled, such as by activating, de-activating, and adjusting operating parameters thereof, to keep the temperature and/or the humidity in a desired range. Further, conditions outside the device may be monitored and used as part of a control system for the cooling systems.

Both system fans and component fans, such as CPU fans, memory fans, video card fans, controller fans, and the like, may be used for cooling system components. When a temperature sensor reads an increase in temperature, a variety of system and component fans coupled to the temperature sensor may be controlled to counteract the increase. For example, a CPU fan and a variety of system fans may be used to cool a CPU. When a temperature change occurs, multiple fans may be activated, deactivated, or adjusted faster or slower at the same time. Control systems for information handling system cooling systems are often designed to provide cooling based on a worst-case scenario of high ambient temperature and heavy component usage. Such design can cause overcooling thereby wasting power and creating sound that may inconvenience a user. Overcooling and sound generation can be limited by adjusting a cooling fan speed control profile based on ambient or component temperature readings.

Figure 1:
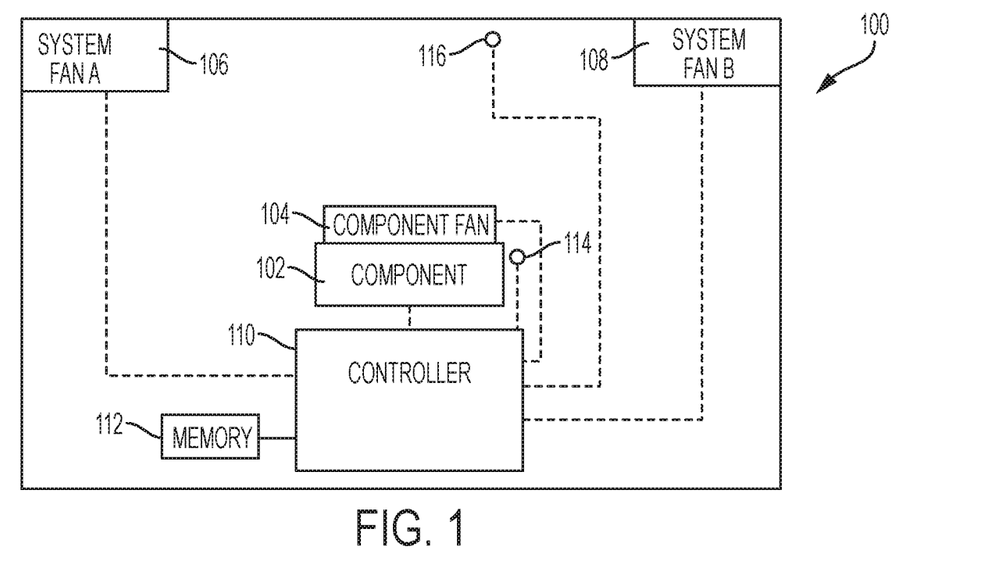
FIG. 1 is a block diagram illustrating a cooling system for a system component of an information handling system according to some embodiments of the disclosure.

FIG. 1 is a block diagram of a cooling system 100 for a system component 102 of an information handling system according to an embodiment of the disclosure. A system component 102, such as a CPU, memory, hard drive, or PCIe peripheral, may be cooled by cooling fans 104-108. A controller 110 may receive a temperature value from a sensor integrated in the system component 102, from an ambient temperature sensor 116, or from an external component temperature sensor 114. The controller 110 may adjust a cooling fan speed control profile for control of at least one cooling fan 104-108 based on the received temperature value. The controller 110 may be configured to generate a control signal for a cooling fan such as system fan A 106, system fan B 108, or component fan 104. The control signal may be a PWM control signal. The controller may also be configured to generate control signals for other system and component cooling fans. Received temperature values may be stored in a memory integrated with the controller 110 or in system memory 112 and may be associated with timing parameters indicating a time at which the temperature value was received.

Alternatively or additionally, a cooling system 100 for a system component 102 of an information handling system may include a liquid cooling system. The liquid cooling system may include a network of tubes to allow water to flow near to and cool the component, a pump to cause the water to flow through the network, and a radiator with at least one fan to control the temperature of the water. The controller 110 may receive a temperature value from a sensor integrated in the system component 102, from an ambient temperature sensor, 116, or from an external component temperature sensor 114. The controller 110 may adjust a liquid cooling system control profile for the liquid cooling system based on the received temperature value. The controller 110 may be configured to generate a control signal for the pump and the at least one fan of the radiator based on the liquid cooling system control profile. The control signal may control the flow rate of water through the water cooling system by controlling a speed of the pump and/or the temperature of the water by controlling a speed of the at least one fan of the radiator.

Figure 2:
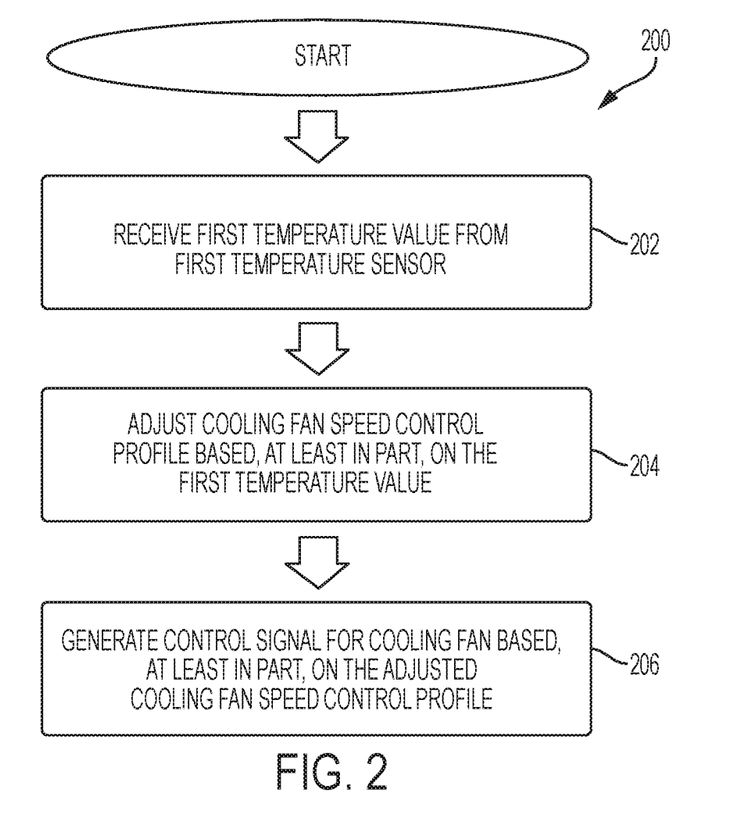
FIG. 2 is a flow chart illustrating an example method of adjusting a cooling fan speed control profile of an information handling system according to some embodiments of the disclosure.

A cooling fan speed control profile may be adjusted based on a temperature value and a control signal for a cooling fan may be generated based on the adjusted cooling fan speed control profile. FIG. 2 is a flow chart illustrating an example method 200 for operating a cooling system of an information handling system according to some embodiments of the disclosure. The method 200 may begin at step 202 with receipt of a first temperature value from a first temperature sensor. As an example, an ambient temperature may be received from an ambient temperature sensor. A cooling fan speed control profile may be adjusted based, at least in part, on the first temperature value, at step 204. The cooling fan speed control profile adjusted may be a PID control profile, a linear control profile, a polynomial control profile, or other control profile. An initial cooling fan speed control profile may be designed for a high ambient temperature or heavy component usage, and then adjusted based on lower received ambient or component temperature values. A control signal, such as a PWM control signal, may be generated for the cooling fan based, at least in part, on the adjusted cooling fan speed control profile, at step 206. The control signal may be generated based on a second temperature value, such as a system component temperature, and the adjusted cooling fan speed control profile.

The second temperature value may be a system or component temperature or another temperature value related to the information handling system that the information handling system cooling system is configured to control. It may be received from the first temperature sensor or another temperature sensor of the information handling system. For example, it may be received from a temperature sensor external to and near a component or a temperature sensor embedded in a component of the information handling system. Alternatively, the second temperature value may be an average of temperatures sensed by multiple temperature sensors throughout the information handling system or another value related to a combination of temperatures sensed throughout the system.

A cooling fan speed for cooling a component of an information handling system may vary based on an ambient temperature of the information handling system. An ambient temperature may be received, and a cooling fan speed control profile may be adjusted, based on the ambient temperature. Following the adjustment, a control signal may be generated based on the adjusted cooling fan speed control profile. An example method 300 for adjusting a cooling fan speed control profile based on a received ambient temperature is described with reference to FIG. 3. The method 300 may begin with receipt of an ambient temperature value at step 302. The ambient temperature value may be received from an ambient temperature sensor and stored in a memory. At step 304, a determination may be made as to whether the ambient temperature has increased by at least a predetermined amount, such as ten degrees Celsius, following the last cooling fan speed control profile adjustment. The determination may be made by comparing the received ambient temperature value to an ambient temperature value stored in memory at the time of the most recent cooling fan speed control profile adjustment. If so, the cooling fan speed control profile may be adjusted, at step 306, based on the received ambient temperature value, and subsequent cooling fan speed control signals may be generated based on the adjusted cooling fan speed control profile. If no sufficient increase in the ambient temperature is detected at step 304 then the method 300 continues to step 308.

Figure 3:
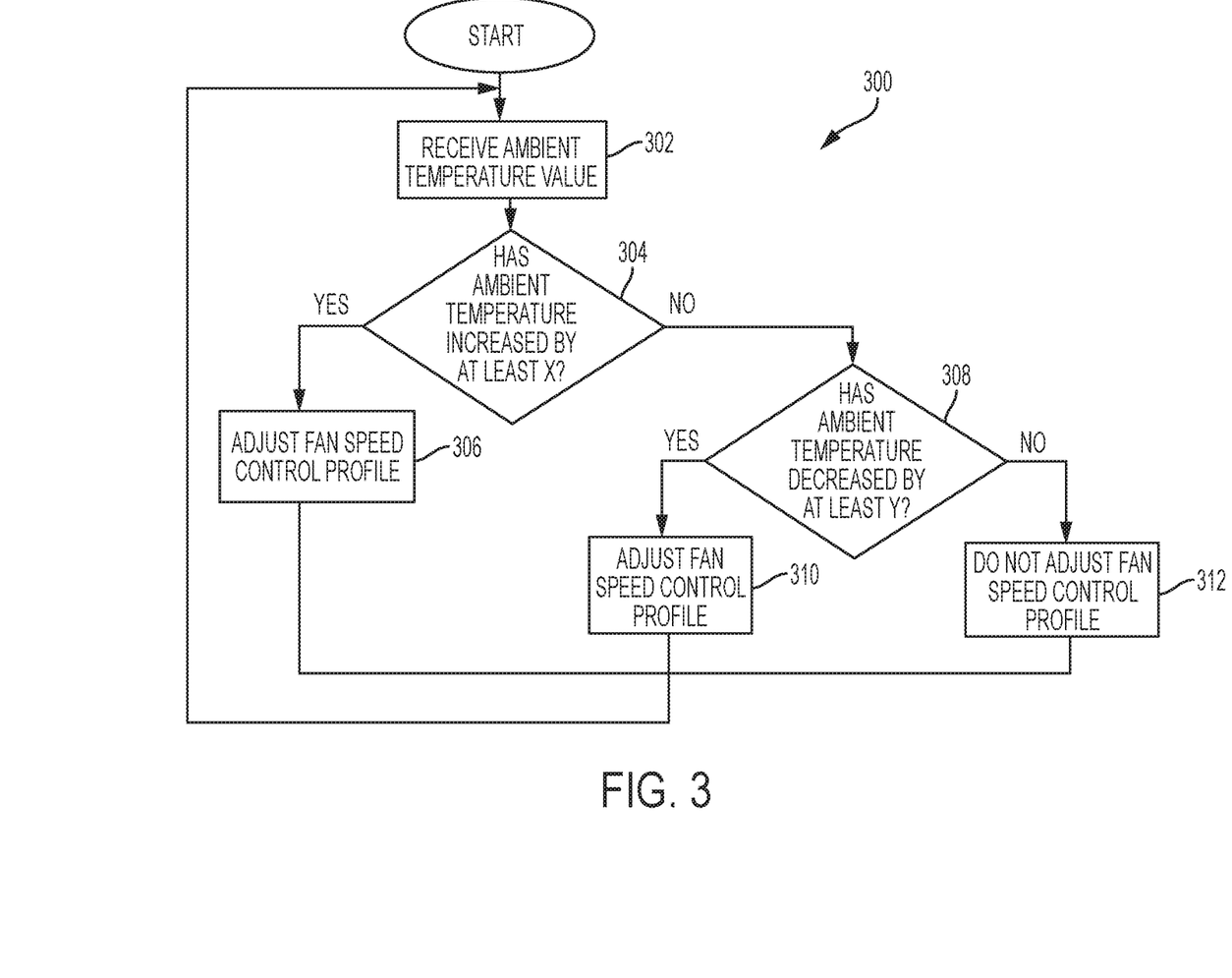
FIG. 3 is a flow chart illustrating an example method of adjusting a cooling fan speed control profile of an information handling system according to some embodiments of the disclosure.

At step 308, a determination may be made if the ambient temperature has decreased by at least a predetermined amount, such as ten degrees Celsius, following the last cooling fan speed control profile adjustment. The determination may be made by comparing the received ambient temperature value to an ambient temperature value stored in memory at the time of the most recent cooling fan speed control profile adjustment. If so, the cooling fan speed control profile may be adjusted, at step 310, based on the received ambient temperature value, and subsequent cooling fan speed control signals may be generated based on the adjusted cooling fan speed control profile. If the received ambient temperature has neither increased by a first threshold temperature value nor decreased by a second threshold temperature value, the cooling fan speed control profile may remain unadjusted at step 312. The method may be repeated as desired by returning to step 302. For example, the method may be repeated at periodic intervals, such as every 100 milliseconds, or repeated at events, such as when a certain change in ambient temperature has occurred.

A maximum temperature of a component of an information handling system under a maximum power load may vary depending on an ambient temperature of the information handling system. Therefore, it may be desirable to adjust a cooling fan speed control profile based on the ambient temperature to provide sufficient component cooling at a maximum component temperature. A further example method 400 for adjusting a cooling fan speed control profile is described with reference to FIG. 4. The method 400 may begin with receipt of an ambient temperature value at step 402. The ambient temperature value may indicate an ambient temperature within the information handling system or an ambient temperature of the environment in which the information handling system is located. The ambient temperature may be received from a sensor outside of the information handling system chassis or may be inferred from a system fan of the information handling system.

Figure 4:
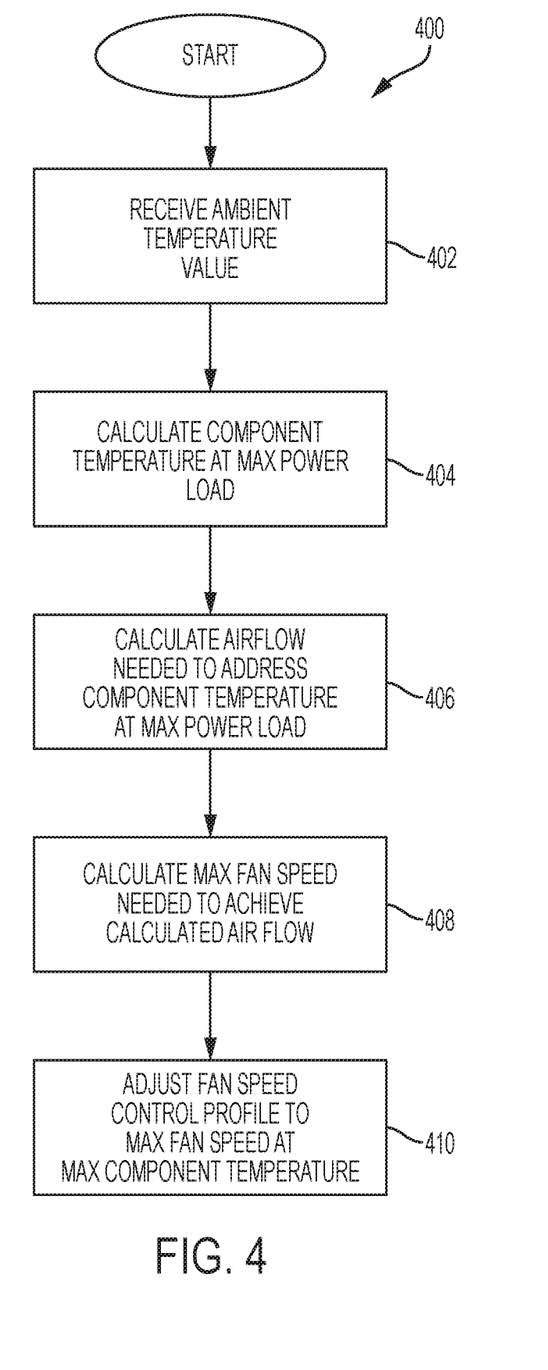
FIG. 4 is a flow chart illustrating an example method of adjusting a cooling fan speed control profile of an information handling system according to some embodiments of the disclosure.
Figure 5:
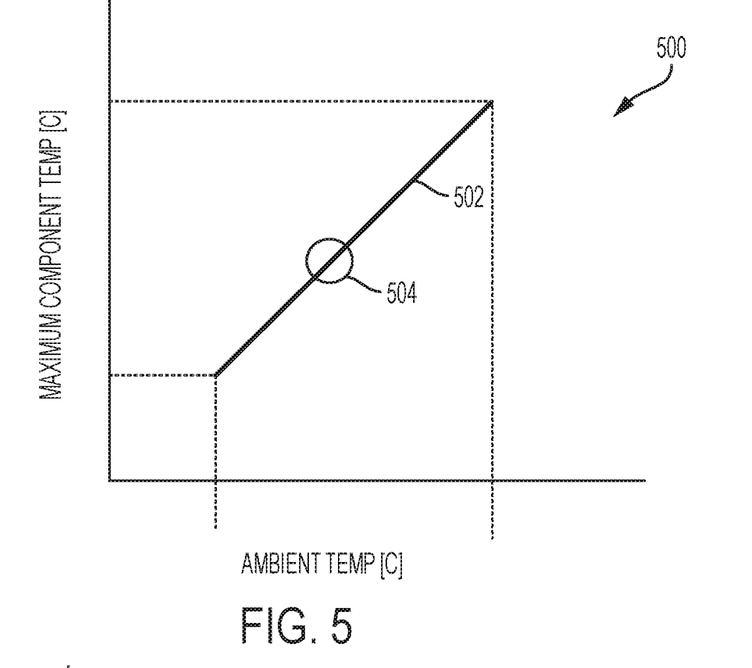
FIG. 5 is a graph illustrating maximum component temperature over a spectrum of ambient temperatures, according to some embodiments of the disclosure.

A maximum component temperature of a system component under a maximum power load when the system is at an ambient temperature indicated by the received ambient temperature value may then be calculated at step 404. FIG. 5 is a graph 500 illustrating a relationship between an ambient temperature and a maximum component temperature of an information handling system. The maximum component temperature may increase linearly as the ambient temperature increases. Thus, the maximum component temperature at the received ambient temperature may be represented by a point 504 on the line 502.

Figure 6:
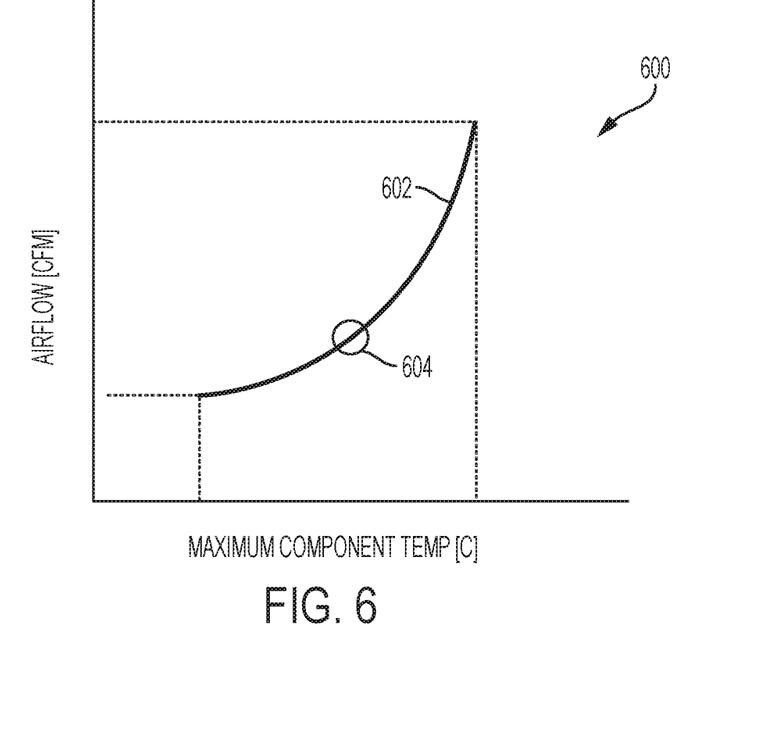
FIG. 6 is a graph illustrating airflow used to cool a component as a function of component temperatures according to some embodiments of the disclosure.

An airflow around the component used to cool the component at the calculated maximum component temperature may then be calculated at step 406. FIG. 6 is a graph 600 illustrating a relationship between airflow needed to adequately cool a component at a maximum component temperature. The relationship between necessary airflow and maximum component temperature may be non-linear and may be represented by a cubic polynomial. Thus, the airflow used to cool a component at its maximum temperature at a specific ambient temperature may be represented by a point 604 on the line 602.

Figure 7:
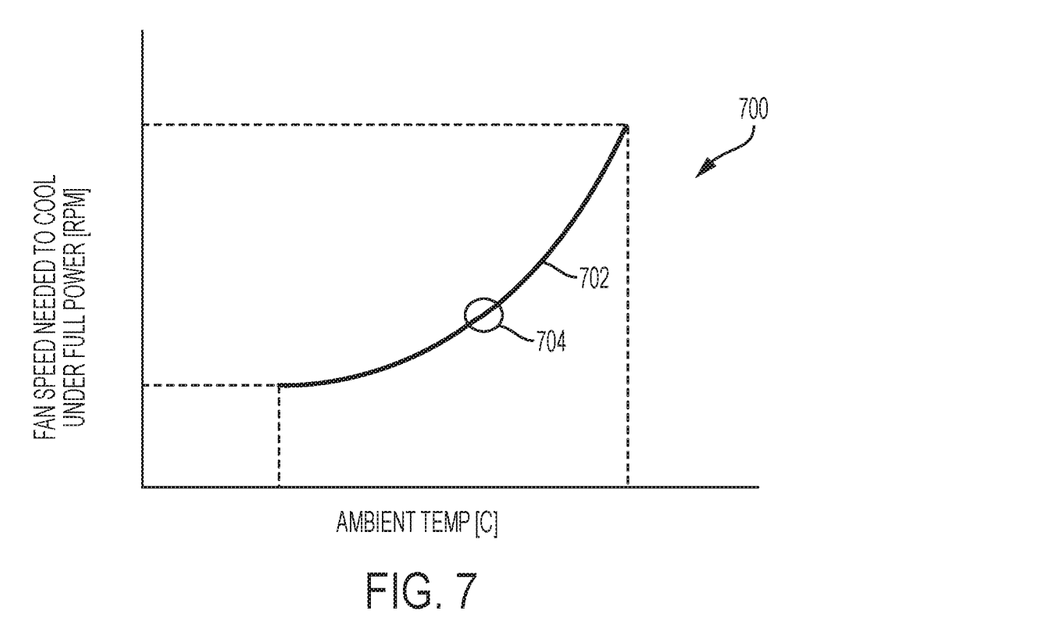
FIG. 7 is a graph illustrating fan speed used to cool the component under a full power load as a function of ambient temperatures according to some embodiments of the disclosure.

A maximum fan speed of the cooling fan speed control profile used to create the calculated airflow around the component may then be calculated at step 408. FIG. 7 is a graph 700 illustrating a relationship between ambient temperature and fan speed used to cool a component under a full-power load. The relationship between the needed fan speed and ambient temperature may be non-linear. Thus, a maximum fan speed used to cool a component under a full power load, and therefore at a maximum component temperature, at a specific ambient temperature may be represented by a point 704 on line 702. A cooling fan speed control profile may then be adjusted, at step 410, based, at least in part, on the calculated maximum fan speed. Alternatively, a cooling fan speed at another component temperature value may be calculated and the cooling fan speed control profile may be adjusted based, at least in part, on that cooling fan speed. Adjusting a cooling fan speed control profile may include recalculating the profile in its entirety based on the calculated maximum fan speed at the maximum component temperature, or other cooling fan speed, or adjusting it based on a change in maximum fan speed from a previously calculated maximum fan speed.

Figure 8:
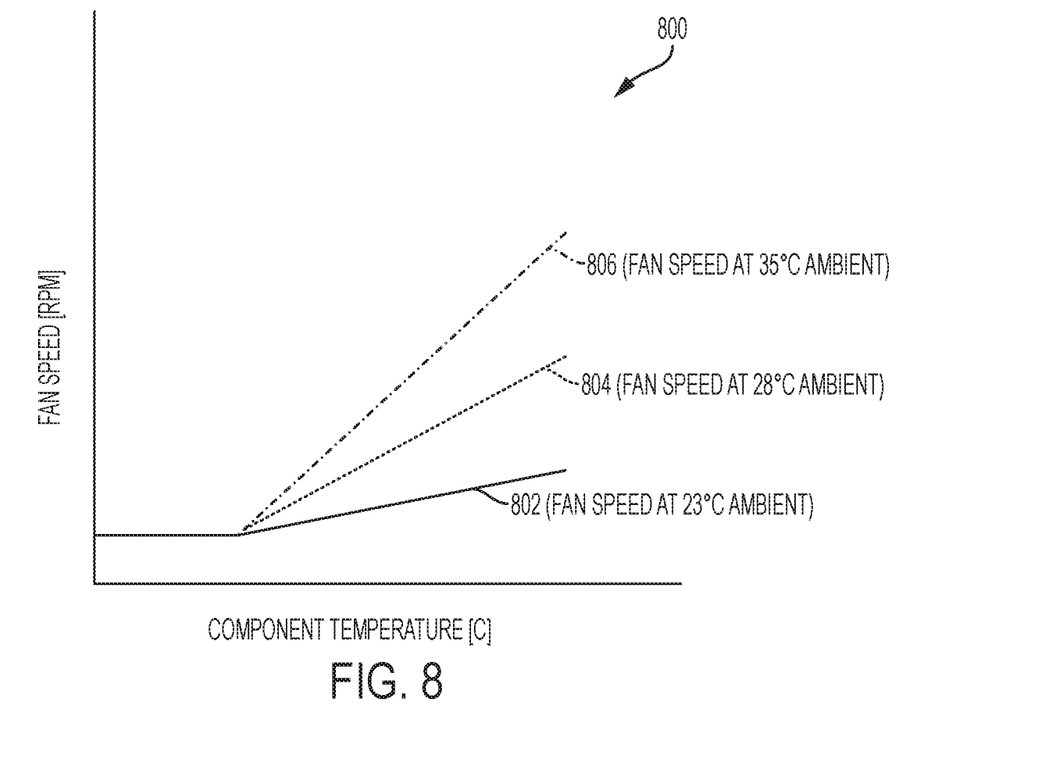
FIG. 8 is a graph illustrating a fan speed response to component temperature according to some embodiments of the disclosure.

A variety of adjustments to a cooling fan speed control profile can be made to adjust operation of a cooling fan based on a received ambient temperature. FIG. 8 is a graph 800 illustrating three possible cooling fan speed control profiles 802, 804, 806. A cooling fan speed control profile may include multiple possible component temperatures and corresponding cooling fan speeds. The profile may also or alternatively include a definition of a relationship between temperatures and speeds. A cooling fan may operate at an idle speed when a temperature of a component is at or below an idle power component temperature. The corresponding fan speeds and component temperatures may be combined into multiple data points which may be illustrated on a graph, such as lines 802, 804, and 806, or in a table of corresponding values. The relationship between cooling fan speed used to cool a component and temperature of the component may be represented by, for example, a linear or a polynomial function. Although linear functions are represented by lines 802, 804, and 806, a line representing a polynomial function with a variable slope may be used to represent a cooling fan speed control profile.

One method for adjusting a cooling fan speed control profile in response to a change in ambient temperature is to adjust a slope of a line, such as lines 802, 804, and 806. Adjusting the slope may be accomplished by increasing or decreasing a maximum fan speed of the cooling fan based on a change in ambient temperature as discussed with respect to FIG. 4. An idle fan speed at a temperature the component is expected to experience under an idle power load may be held constant while a maximum fan speed may be adjusted. The fan speed values of the intermediate component temperatures between the temperature at the idle power load and the maximum temperature may be adjusted to form a straight line from the idle temperature and fan speed to the maximum temperature and fan speed. Thus, the fan speed values may be increased or decreased by different amounts. For example, if an ambient temperature increases from twenty-three degrees Celsius to twenty-eight degrees Celsius a cooling fan speed control profile may be adjusted from a line with a lesser slope, such as line 802, to a line with a greater slope, such as line 804. Alternatively, if an ambient temperature decreases from thirty-five degrees Celsius to twenty-eight degrees Celsius, a cooling fan speed control profile may be adjusted from a line with a greater slope, such as line 806, to a line with a lesser slope, such as line 804. Thus, adjusting a cooling fan speed control profile may include adjusting the rate at which fan speed increases for every unit increase in component temperature. Multiple fan speed control profiles such as lines 802, 804, and 806 may be stored in a memory. When an ambient temperature value corresponding to a stored fan speed control profile is received, a corresponding cooling fan speed control profile may be recalled from the memory and applied to the cooling fan.

Figure 9:
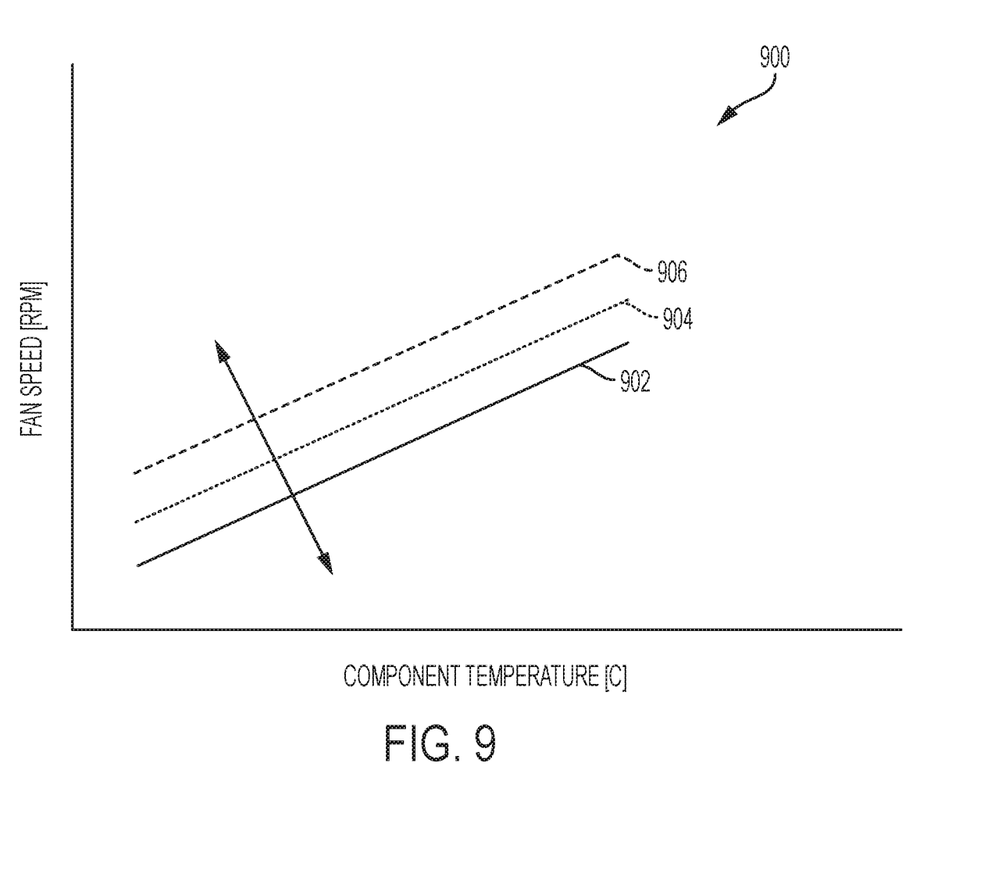
FIG. 9 is a graph illustrating a fan speed response to component temperature according to some embodiments of the disclosure.

A cooling fan speed control profile may be adjusted based on a change in ambient temperature by increasing every fan speed in the cooling fan speed control profile by an equal amount. FIG. 9 is a graph 900 of three possible cooling fan speed control profiles 902, 904, and 906 according to some embodiments of the disclosure. A default cooling fan speed control profile, such as cooling fan speed control profile 902 may be created at a baseline ambient temperature, such as twenty-three degrees Celsius. An increase of ambient temperature of three degrees Celsius may cause a cooling fan speed control profile to shift from line 902 to line 906. A increase of two degrees Celsius in ambient temperature may cause a cooling fan speed control profile to shift from a line 902 to a line 904.

A change in ambient temperature may be detected and used to adjust the cooling fan speed control profile from one of the lines 902, 904, 906 to another of the lines. Component heating, and thus its temperature, is affected by the ambient temperature. A change in component temperature across possible component temperatures may be defined by a linear function. A change in air flow used to cool the component may be calculated based on the change in component temperature. The change in the air flow as a function of component temperature may be defined by a polynomial function, for example, a cubic polynomial function. A change in fan speeds used to create the change in air flow may then be calculated. The fan speed control profile may then be adjusted based on the change in the fan speeds alone or with an adjustment based on other temperature feedback. In one example, a constant value based on a change in ambient temperature may be added to or subtracted from each of a plurality of fan speed values of a cooling fan speed control profile. Adding the constant value may serve to adjust the cooling fan speed control profile by shifting the cooling fan speed control profile up or down on the graph 900.

Adjustment of a cooling fan speed control profile may be based on a received component temperature. An example method 1000 for adjusting a cooling fan speed control profile based on a received component temperature is described with reference to FIG. 10. A method 1000 may begin at step 1002 with receipt of a component temperature value. The component temperature value may be recorded in a memory at step 1004. Timing data related to when the component temperature value was received may also be recorded in the memory. The recorded component temperature value and timing data may be associated with a user profile. Several recorded component temperature values may be associated with the user profile. In some embodiments, the user profile may be associated with a particular user account, a particular information handling system, a particular set of information handling systems, or a particular model of information handling system. The recorded component temperature values may be used to understand system usage by particular users or in particular environments or configurations.

Figure 10:
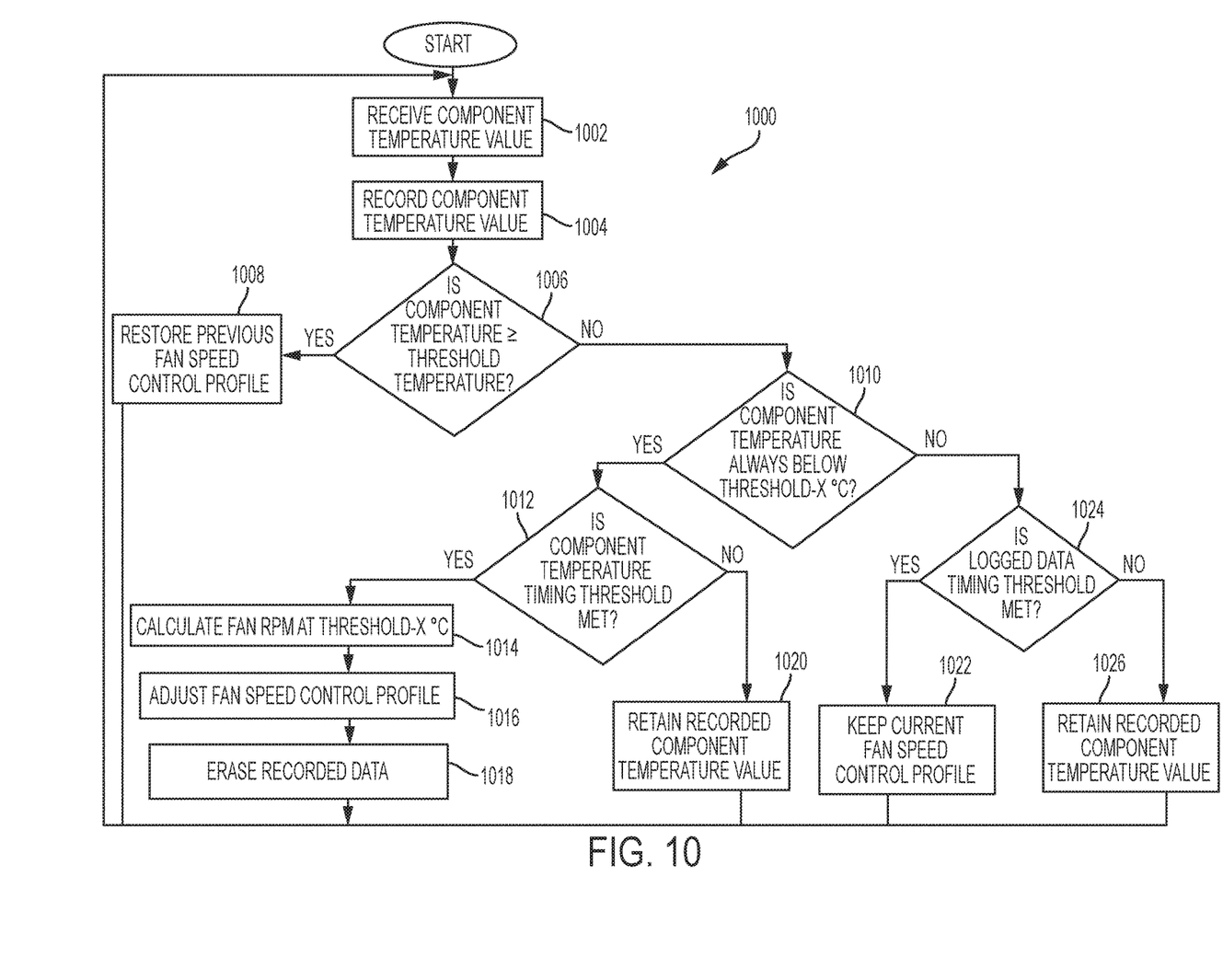
FIG. 10 is a flow chart illustrating an example method of adjusting a cooling fan speed control profile of an information handling system according to some embodiments of the disclosure.

The received component temperature value may be compared, at step 1006, with a threshold component temperature value to determine whether a component temperature is greater than the threshold component temperature. The threshold component temperature may be a maximum temperature tolerance of the component or a value a small amount lower than the maximum temperature tolerance (e.g., 1, 2, 5, or 10% less). If the component temperature is greater than, or greater than or equal to, the component threshold temperature then a cooling fan speed control profile may be adjusted. Adjusting the cooling fan speed control profile may include restoring it to a previous cooling fan speed control profile. The previous fan speed control profile may be a profile that was calculated and applied at an earlier time or it may be a default cooling fan speed control profile. The method 1000 may be repeated at a periodic interval or at the occurrence of a specific event, such as a component temperature overshoot of the component threshold temperature or a system configuration change. Repetition of the method 1000 may also be manually triggered, such as through a BIOS or an application.

Returning to step 1006, if the component temperature is less than the component threshold temperature, a determination may be made, at step 1010, if the component temperature has always been below an adjustment threshold temperature, as indicated by recorded component temperature values. The adjustment threshold temperature is a temperature below the component threshold temperature. For example, if a component threshold temperature is forty degrees Celsius, the adjustment threshold temperature may be thirty degrees Celsius, or ten degrees Celsius below the threshold temperature. If the component temperature has always been below the adjustment threshold temperature, a determination may be made, at step 1012, if a component temperature timing threshold has been met, as indicated by recorded component temperature values. For example, a determination may be made if the component temperature has been below the adjustment threshold temperature for at least three hours. If the component temperature timing threshold has been met, the system fan speed control profile may be adjusted based on the adjustment threshold temperature at step 1016. For example, if the component temperature has always been below thirty degrees Celsius, the system fan speed control profile may be adjusted based on a temperature of thirty degrees Celsius. A fan speed may be calculated, at step 1014, for cooling the component at the adjustment threshold temperature. The fan speed may be a maximum fan speed of the cooling fan speed control profile. The cooling fan speed control profile may then be adjusted based on the calculated fan speed at step 1016. A slope of the cooling fan speed control profile may be adjusted as in the example of FIG. 8 or the cooling fan speed control profile may be shifted as in the example of FIG. 9. After the cooling fan speed control profile is adjusted, the recorded data, such as the recorded component temperature value and the timing data related to the recorded component temperature value, may be erased, at step 1018. If the component temperature timing threshold of step 1012 is not met, the recorded component temperature value and timing data may be retained at step 1020. The method 1000 may be repeated periodically or in response to an event. When the method is repeated after an adjustment of the cooling fan speed control profile, the adjustment threshold temperature may be adjusted. For example, the adjustment threshold temperature may be reduced from thirty degrees Celsius to twenty degrees Celsius.

Returning to block 1010, if the component temperature has not always been below the adjustment threshold temperature, a determination may be made of whether a logged data timing threshold is met at step 1024. Determining whether the logged data timing threshold is met may include determining whether component temperature values have been recorded over a specific period of time, such as three hours. If the logged data timing threshold is met, the current fan speed control profile may be retained at step 1022. In some embodiments, no further adjustments to the system fan speed control profile may be made, if the logged data timing threshold is met. If the logged data timing threshold is not met, the recorded component temperature value and timing data may be retained at step 1026. The method 1000 may then be repeated periodically or in response to an event.

Figure 11:
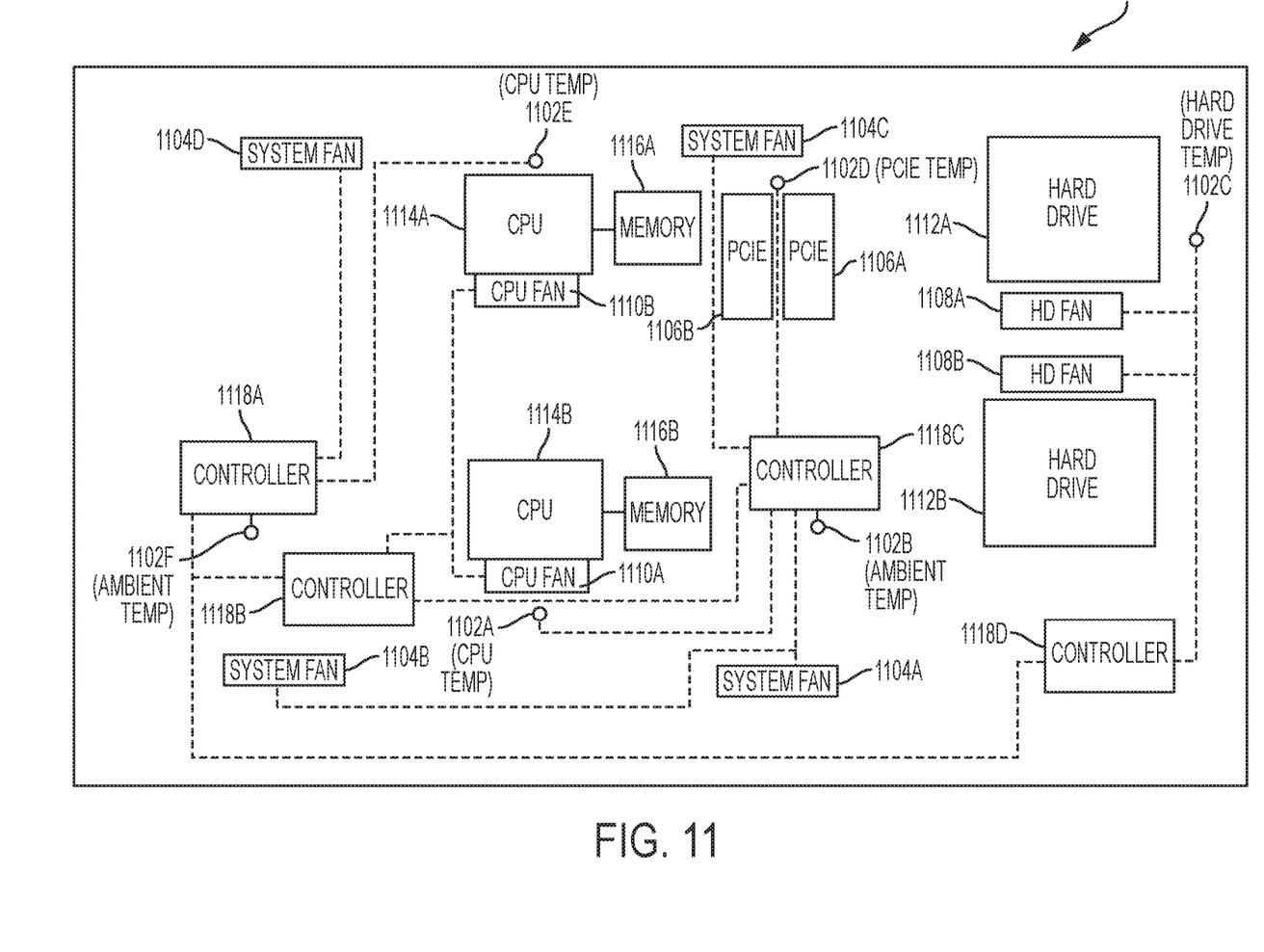
FIG. 11 is a block diagram illustrating an information handling system with cooling system according to some embodiments of the disclosure.

FIG. 11 is a block diagram illustrating an information handling system 1100 according to some embodiments of the invention. An information handling system 1100 may include sensors designed to collect data as to the environment of the information handling system, such as temperature sensors 1102A-F. The system 1100 may also include system cooling fans such as system fans 1104A-D, and component cooling fans such as CPU fans 1110A-B and hard drive fans 1108A-B. The system 1100 may include one or more system components such as CPUs 1114A-B, hard drives 1112A-B, peripheral component interconnect express (PCIe) peripherals 1106A-B, such as video cards, and memory units 1116A-B. The system 400 may also include controllers, such as controllers 1118A-D. The controllers 1118A-D may receive data from the sensors in the form of temperature values. The controllers may adjust cooling fan speed control profiles and generate control signals for control of the system and component fans based, at least in part on the data obtained from the temperature sensors. Controllers 1118A-D may be contained in a single chip configuration or may be located on separate chips. Controller 1118B may be a master controller and may control operation of controllers 1118A and 1118C-D.

The schematic flow chart diagrams of FIGS. 2-4 and FIG. 10 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling a cooling system of an information handling system, comprising:
   receiving a first temperature value from a first temperature sensor;
   adjusting, based at least in part on the first temperature value, a rate at which a speed of a cooling fan is increased for every unit increase of a second temperature value; and
   generating a control signal for operating the cooling fan based, at least in part, on the adjusted rate,
   wherein adjusting the rate comprises adjusting a maximum cooling fan speed while maintaining an idle cooling fan speed.

2. The method of claim 1, wherein the step of adjusting comprises decreasing the maximum cooling fan speed when the first temperature value is less than a threshold first temperature value.

3. The method of claim 1, wherein the first temperature value is an ambient temperature.

4. The method of claim 1, wherein the first temperature value is a component temperature.

5. The method of claim 4, further comprising recording the first temperature value in a user profile as part of a plurality of temperature values, wherein the step of adjusting the rate comprises adjusting the rate based, at least in part, on the user profile.

6. The method of claim 5, wherein the step of adjusting comprises setting the rate to a set rate when the component temperature is greater than a threshold component temperature.

7. The method of claim 5, wherein the rate is adjusted when a temperature measurement of the user profile is below a threshold component temperature for a set period of time.

8. The method of claim 1, wherein the step of adjusting comprises increasing the maximum cooling fan speed when the first temperature value is greater than a threshold first temperature value.

9. An apparatus for controlling a cooling system of an information handling system, comprising:
   a cooling fan;
   a first temperature sensor; and
   a controller coupled to the first temperature sensor and the cooling fan,
   wherein the controller is configured to perform steps comprising:
   receiving a first temperature value from the first temperature sensor;
   adjusting, based at least in part on the first temperature value, a rate at which a speed of the cooling fan is increased for every unit increase of a second temperature value; and
   generating a control signal for operating the cooling fan based, at least in part, on the adjusted rate,
   wherein adjusting the rate comprises adjusting a maximum cooling fan speed while maintaining an idle cooling fan speed.

10. The apparatus of claim 9, wherein the step of adjusting comprises decreasing the maximum cooling fan speed when the first temperature value is less than a threshold first temperature value.

11. The apparatus of claim 9, wherein the first temperature value is an ambient temperature.

12. The apparatus of claim 9, wherein the first temperature value is a component temperature.

13. The apparatus of claim 12, wherein the controller is further configured to perform steps comprising recording the first temperature value in a user profile as part of a plurality of temperature values; and wherein the step of adjusting the rate comprises adjusting the rate based, at least in part on the user profile.

14. The apparatus of claim 13, wherein the step of adjusting comprises setting the rate to a set rate when the component temperature is greater than a threshold component temperature.

15. The apparatus of claim 13, wherein the rate is adjusted when a temperature measurement of the user profile has fallen below a threshold component temperature for a set period of time.

16. The apparatus of claim 9, wherein the step of adjusting comprises increasing the maximum cooling fan speed when the first temperature value is greater than a threshold first temperature value.

* * * * *